US008122267B2

(12) United States Patent
Rui et al.

(10) Patent No.: US 8,122,267 B2
(45) Date of Patent: Feb. 21, 2012

(54) POWER CONTROL CIRCUIT FOR HARD DISK DRIVE

(75) Inventors: Yi Rui, Shenzhen (CN); Cheng-Yang Li, Shenzhen (CN); Jian-She Shen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 422 days.

(21) Appl. No.: 12/545,032

(22) Filed: Aug. 20, 2009

(65) Prior Publication Data
US 2011/0012546 A1    Jan. 20, 2011

(30) Foreign Application Priority Data

Jul. 20, 2009    (CN) .......................... 2009 1 0304519

(51) Int. Cl.
*G06F 1/00* (2006.01)
(52) U.S. Cl. ..................... 713/300; 318/400.3; 717/173; 717/100; 323/304; 234/555
(58) Field of Classification Search ............... 318/400.3; 714/26, 36, 55, 11.002, 11.145; 713/300; 324/555; 717/173, 100; 323/304
See application file for complete search history.

(56) References Cited

U.S. PATENT DOCUMENTS

| 7,155,624 | B2 * | 12/2006 | Kwatra ........................ 713/330 |
| 7,908,508 | B2 * | 3/2011 | Kernahan et al. ............. 713/600 |
| 7,990,157 | B2 * | 8/2011 | Zhou et al. .................... 324/555 |
| 2009/0322346 | A1 * | 12/2009 | Cao ............................... 324/555 |

\* cited by examiner

*Primary Examiner* — Walter Benson
*Assistant Examiner* — Jorge Carrasquillo
(74) *Attorney, Agent, or Firm* — Altis Law Group, Inc.

(57) ABSTRACT

A power control circuit for a hard disk drive (HDD) includes a first control circuit, a second control circuit, a first connector connected to a power supply, the first and second control circuits, and a second connector connected to the first control circuit and the HDD. The power supply outputs a first voltage signal and a second voltage signal to the first and second control circuits via the first connector. The first control circuit converts the first and second voltage signals into a form compatible with a timing sequence of the HDD receiving voltage signals, and outputs the first and second voltage signals to the HDD via the second connector. The second control circuit controls the first control circuit.

18 Claims, 2 Drawing Sheets

POWER CONTROL CIRCUIT FOR HARD DISK DRIVE

BACKGROUND

1. Technical Field

The present disclosure relates to control circuits, and in particular, to a power control circuit for a hard disk drive (HDD).

2. Description of Related Art

Generally, an HDD includes a magnetic pickup head, a spindle motor, and a platter including a number of sectors. When the HDD is powered on, the spindle motor rotates the platter quickly to enable the magnetic pickup head to read data from the sectors. Since the HDD can employ a plurality of platters to increase storage volume, the magnetic pickup head must move rapidly and accurately to read data correctly. Accordingly, any vibration of the HDD may cause the magnetic pickup head to read data erroneously under the high-speed rotation of the platters.

DETAILED DESCRIPTION

Figure 1:
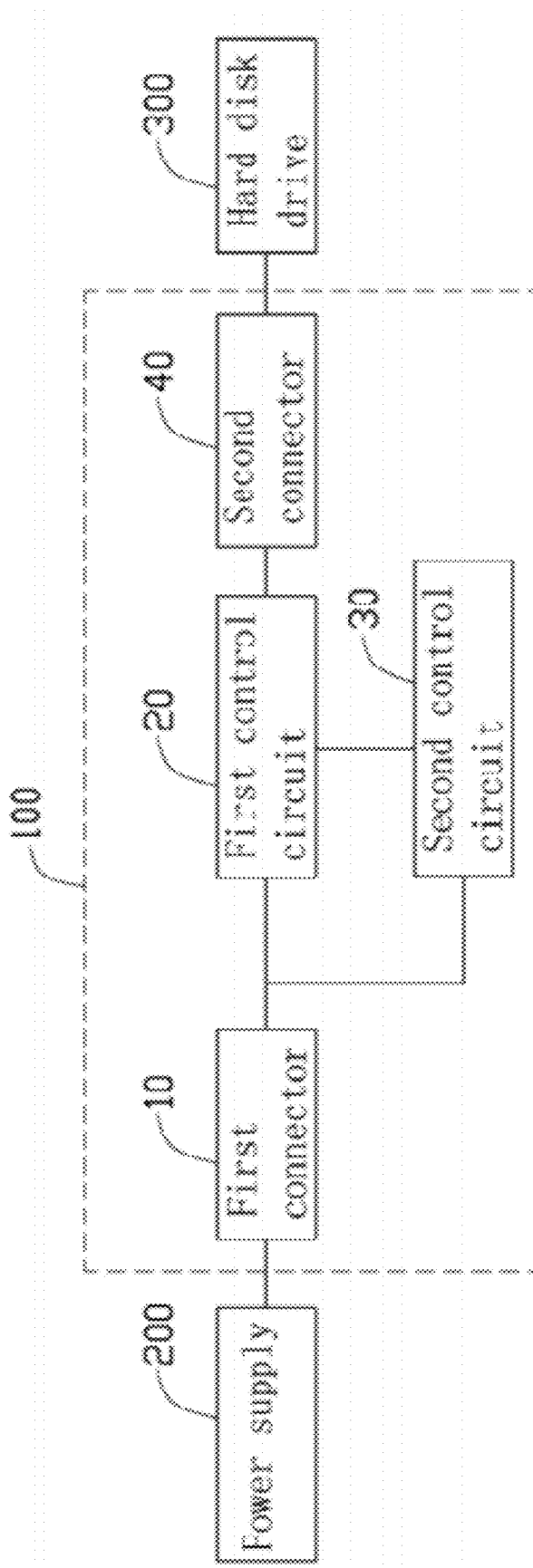
FIG. 1 is a block diagram of an embodiment of a power control circuit connecting a power supply and a hard disk drive.

Referring to FIG. 1, an exemplary embodiment of a power control circuit 100 for a hard disk drive (HDD) 300 includes a first connector 10, a first control circuit 20, a second control circuit 30, and a second connector 40. The first connector 10 is connected to the first control circuit 20, the second control circuit 30 and a power supply 200. The power supply 200 supplies power to the first control circuit 20 and the second control circuit 30 via the first connector 10. The second connector 40 is connected to the first control circuit 20 and the HDD 300. The first control circuit 20 supplies power to the HDD 300 via the second connector 40. The second control circuit 30 is also connected to the first control circuit 20 to control the first control circuit 20. In one embodiment, the power control circuit 100 is formed on a printed circuit board. The second connector 40 may be an external serial advanced technology attachment (SATA) power connector. The power supply 200 may be a computer power supply, such as an advanced technology extended power supply. The HDD 300 may be a SATA HDD.

Figure 2:
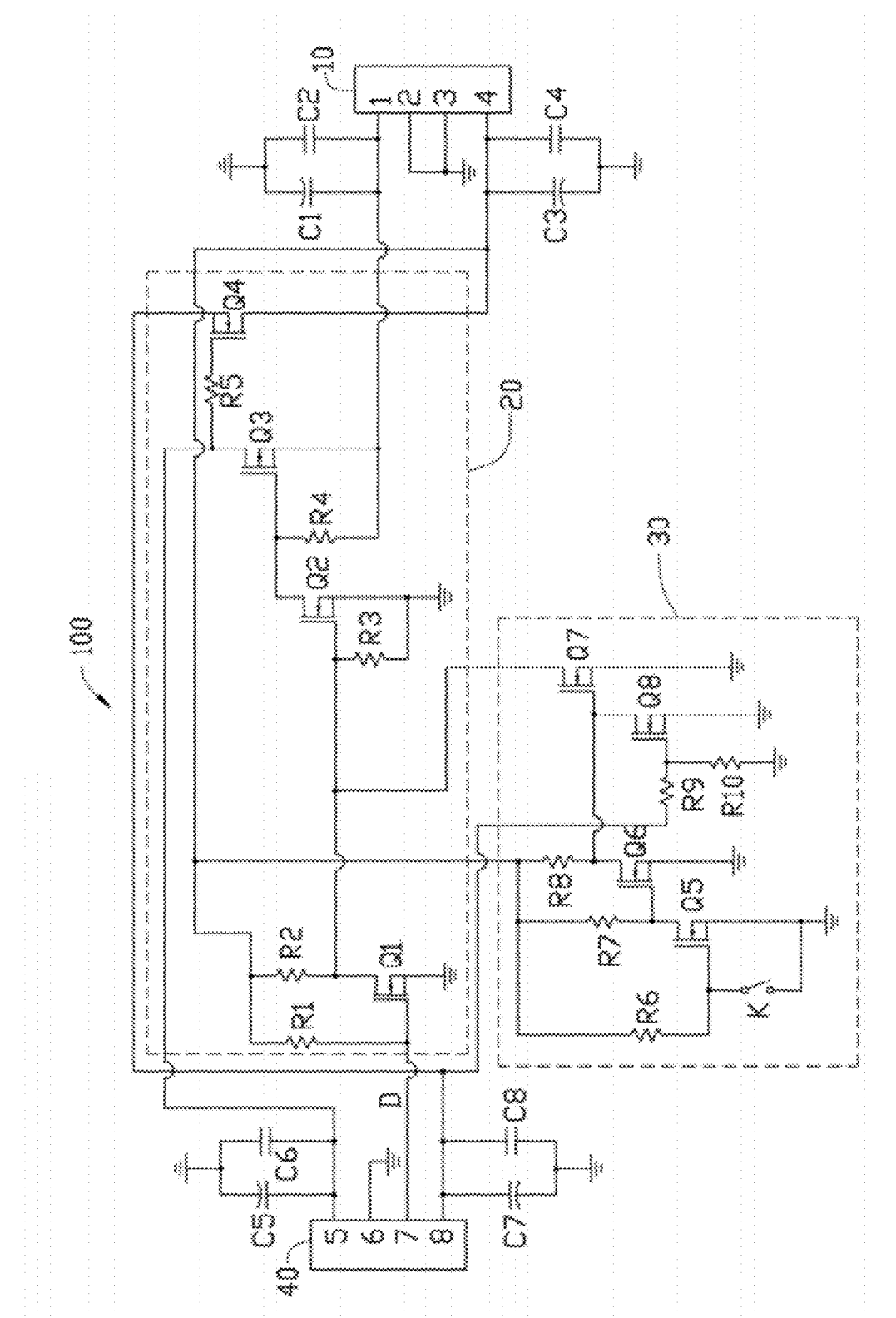
FIG. 2 is a circuit diagram of an embodiment of the power control circuit of FIG. 1.

Referring to FIG. 2, the first connector 10 includes a first power input pin 1, a second power input pin 4, and two ground pins 2, 3. When the first connector 10 is connected to the power supply 200, the first power input pin 1 receives a first voltage signal, such as a 12V voltage signal, from the power supply 200, and the second power input pin 4 receives a second voltage signal, such as a 5V voltage signal, from the power supply 200, and the ground pins 2, 3 are grounded. A capacitor C1 includes a positive terminal connected to the first power input pin 1 and grounded via a capacitor C2, and a grounded negative terminal. A capacitor C3 includes a positive terminal connected to the second power input pin 4 and grounded via a capacitor C4, and a grounded negative terminal.

The second connector 40 includes a first power output pin 5, a grounded ground pin 6, a detection pin 7, and a second power output pin 8. When the second connector 40 is connected to the HDD 300, the first power output pin 5 outputs the first voltage signal to the HDD 300, the second power output pin 8 outputs the second voltage signal to the HDD 300. A capacitor C5 includes a positive terminal connected to the first power output pin 5 and grounded via a capacitor C6, and a grounded negative terminal. A capacitor C7 includes a positive terminal connected to the second power output pin 8 and grounded via a capacitor C8, and a grounded negative terminal. In one embodiment, the capacitors C1, C3, C5, and C7 are electrolytic capacitors, and function as filtering elements to filter noise signals of high frequencies. The capacitors C2, C4, C6, and C8 are ceramic capacitors, and function as filtering elements to filter noise signals of low frequencies. In other embodiments, the capacitors C1-C8 may be deleted to save costs.

The first control circuit 20 includes four transistors Q1-Q4 functioning as electric switches, and five resistors R1-R5. A first terminal of the transistor Q1 is connected to the detection pin 7 of the second connector 40, receiving a detection signal D, and connected to the second power input pin 4 of the first connector 10 via the resistor R1. A second terminal of the transistor Q1 is connected to the second power input pin 4 of the first connector 10 via the resistor R2. A third terminal of the transistor Q1 is grounded. A first terminal of the transistor Q2 is connected to the second terminal of the transistor Q1, and grounded via the resistor R3. A second terminal of the transistor Q2 is connected to the first power input pin 1 of the first connector 10 via the resistor R4. A third terminal of the transistor Q2 is grounded. A first terminal of the transistor Q3 is connected to the second terminal of the transistor Q2. A second terminal of the transistor Q3 is connected to the first power output pin 5 of the second connector 40. A third terminal of the transistor Q3 is connected to the first power input pin 1 of the first connector 10. A first terminal of the transistor Q4 is connected to the second terminal of the transistor Q3 via the resistor R5. A second terminal of the transistor Q4 is connected to the second power input pin 4 of the first connector 10. A third terminal of the transistor Q4 is connected to the second power output pin 8 of the second connector 40.

The second control circuit 40 includes four transistors Q5-Q8 functioning as electric switches, five resistors R6-R10, and a manual switch K. A first terminal of the transistor Q5 is connected to the second power input pin 4 of the first connector 10 via the resistor R6, and grounded via the manual switch K. A second terminal of the transistor Q5 is connected to the second power input pin 4 of the first connector 10 via the resistor R7. A third terminal of the transistor Q5 is grounded. A first terminal of the transistor Q6 is connected to the second terminal of the transistor Q5. A second terminal of the transistor Q6 is connected to the second power input pin 4 of the first connector 10 via the resistor R8. A third terminal of the transistor Q6 is grounded. A first terminal of the transistor Q7 is connected to the second terminal of the transistor Q6. A second terminal of the transistor Q7 is connected to the second terminal of the transistor Q1 of the first control circuit 20. A third terminal of the transistor Q7 is grounded. A first terminal of the transistor Q8 is connected to the third terminal of the transistor Q4 of the first control circuit 20 via the resistor R9, and grounded via the resistor R10. A second terminal of the transistor Q8 is connected to the second terminal of the transistor Q6. A third terminal of the transistor Q8 is grounded. In one embodiment, the transistors Q1-Q8 are metal-oxide-semiconductor field-effect transistors (MOSFETs), and the first, second, and third terminals of each of the transistors Q1-Q8 are gates, drains, and sources respectively. In this embodiment, the transistors Q1, Q2, Q4-Q8 are N-channel MOSFETs, the transistor Q3 is a P-channel MOS- FET. The manual switch K includes a button, the manual switch K is closed when the button is press down, and the manual switch K is open when the button is without pressure.

In use, the first connector 10 is connected to the power supply 200 and the second connector 40 is connected to the HDD 300, the first power input pin 1 receives the first voltage signal from the power supply 200, and transmits the first voltage signal to the first control circuit 20. The second power input pin 4 receives the second voltage signal from the power supply 200, and transmits the second voltage signal to the first control circuit 20 and the second control circuit 30. If a power connector of the HDD 300 is connected to the second connector 40 properly, because a pin of the power connector of the HDD 300 corresponding to the detection pin 7 is grounded, the detection pin 7 outputs the detection signal D at a low level to turn off the transistor Q1, the transistors Q2-Q4 are turned on. The first voltage signal is transmitted to the first power output pin 5 via the transistor Q3, and further transmitted to the HDD 300 via the second connector 400. The second voltage signal is transmitted to the second power output pin 8 via the transistor Q4, and further transmitted to the HDD 300 via the second connector 400. Therefore, the HDD 300 is power on. In this embodiment, only when the transistor Q3 is turn on, the first voltage signal is transmitted to the first terminal of the transistor Q4 via the transistor Q3 to turn on the transistor Q4, the second voltage signal can be transmitted to the second power output pin 8 via the transistor Q4. That is, the second connector 40 receives the second voltage signal after receiving the first voltage signal, and outputs the first voltage signal and the second voltage signal to the HDD 300 in order to satisfy a timing sequence of the HDD 300 receiving voltage signals.

When the manual switch K is open, the transistor Q5 is turned on, the transistor Q6 is turned off, the transistor Q7 is turned on. The second terminal of the transistor Q7 is at low level to turn off the transistor Q2, the transistors Q3, Q4 are turned off. Therefore, the first and second voltage signals cannot be transmitted to the second connector 40 via the first control circuit 20, and the second connector 40 cannot supply power to the HDD 300 accordingly.

When the manual switch K is closed, voltage at the first terminal of the transistor Q5 is pulled down to a low level to turn off the transistor Q5, the transistor Q6 is turned on, the transistor Q7 is turned off, the first control circuit 20 works normally, the first and second voltage signals are transmitted to the second connector 40. At this time, the second voltage signal is transmitted to the first terminal of the transistor Q8 via the transistor Q4 and the resistor R9 to turn on the transistor Q8, the transistor Q7 maintains a turned off state whether the manual switch K is closed or open. In summary, when the manual switch K is open, the first control circuit 20 cannot transmit the first and second voltage signals to the second connector 40, and once the manual switch K is closed, the first control circuit 20 works normally.

When the power connector of the HDD 300 is received in the second connector 40, vibration may occur, and some pins may suffer poor connection. If some pins of the HDD 300 are bad and power is supplied to the HDD 300 immediately, the HDD 300 may be damaged. Therefore, the power control circuit 100 employs the detection pin 7, the first control circuit 20, and the second control circuit 30 to protect the HDD 300 from damage. The detection pin 7 detects whether the power connector of the HDD 300 is connected to the second connector 40 properly, and only when the power connector of the HDD 300 is connected to the second connector 40 properly, does the first control circuit 20 begin operating. The first control circuit 20 converts the first and second voltage signals into a form to compatible with a timing sequence of the HDD 300 receiving voltage signals. With activation and deactivation of the manual switch K when the HDD 300 is connected to the second connector 40 and is not vibrating, the second control circuit 30 enables the first control circuit 20 to work normally. In other embodiments, if the power connector of the HDD 300 is connected to the second connector 40 without vibration, the second control circuit 30 can be deleted to save costs.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A power control circuit for a hard disk drive (HDD), the circuit comprising:
   a first connector connected to a power supply, comprising a first power input pin receiving a first voltage signal from the power supply, and a second power input pin receiving a second voltage signal from the power supply;
   a second connector connected to the HDD, the second connector comprising a detection pin outputting a detection signal, a first power output pin outputting the first voltage signal to the HDD, and a second power output pin outputting the second voltage signal to the HDD; and
   a first control circuit, comprising:
     a first electric switch comprising a control terminal connected to the detection pin of the second connector receiving the detection signal and connected to the second power input pin of the first connector via a first resistor, a power terminal connected to the second power input pin of the first connector via a second resistor, and a ground terminal;
     a second electric switch comprising a control terminal connected to the power terminal of the first electric switch, a power terminal connected to the first power input pin of the first connector via a third resistor, and a ground terminal;
     a third electric switch comprising a control terminal connected to the power terminal of the second electric switch, an input terminal connected to the first power input pin of the first connector, and an output terminal connected to the first power output pin of the second connector; and
     a fourth electric switch comprising a control terminal connected to the output terminal of the third electric switch via a fourth resistor, an input terminal connected to the second power input pin of the first connector, and an output terminal connected to the second power output pin of the second connector;
   wherein in response to the HDD being properly connected to the second connector, the detection pin outputs the detection signal at a low level to turn off the first electric switch, therefore, the second, third, and fourth electric switches are turned on, the first and second voltage signals are transmitted to the HDD via the third and fourth electric switches and the second connector.

2. The circuit of claim 1, wherein the first, second, third, and fourth electric switches are metal-oxide-semiconductor field-effect transistors (MOSFETs).

3. The circuit of claim 2, wherein the first and second electric switches are N-channel MOSFETs, the control, power, and ground terminals of each of the first and second electric switches are a gate, a drain, and a source, respectively.

4. The circuit of claim 2, wherein the third electric switch is a P-channel MOSFET, and the control, input, and output terminals of the third electric switch are a gate, a source, and a drain, respectively.

5. The circuit of claim 2, wherein the fourth electric switch is an N-channel MOSFET, and the control, input, and output terminals of the fourth electric switch are a gate, a drain, and a source, respectively.

6. The circuit of claim 1, wherein each of the first and second power input pins of the first connector, and the first and second power output pins of the second connector is grounded via a filtering circuit.

7. The circuit of claim 6, wherein each filtering circuit includes a first capacitor and a second capacitor connected in parallel.

8. The circuit of claim 7, wherein the first capacitor is an electrolytic capacitor to filter noise signals of low frequency.

9. The circuit of claim 7, wherein the second capacitor is a ceramic capacitor to filter noise signals of high frequency.

10. A power control circuit for a hard disk drive (HDD), the circuit comprising:
   a first connector connected to a power supply, the first connector comprising a first power input pin receiving a first voltage signal from the power supply, and a second power input pin receiving a second voltage signal from the power supply;
   a second connector connected to the HDD, the second connector comprising a detection pin outputting a detection signal, a first power output pin outputting the first voltage signal, and a second power output pin outputting the second voltage signal;
   a first control circuit, comprising:
      a first electric switch comprising a control terminal connected to the detection pin of the second connector receiving the detection signal and connected to the second power input pin of the first connector via a first resistor, a power terminal connected to the second power input pin of the first connector via a second resistor, and a ground terminal;
      a second electric switch comprising a control terminal connected to the power terminal of the first electric switch, a power terminal connected to the first power input pin of the first connector via a third resistor, and a ground terminal;
      a third electric switch comprising a control terminal connected to the power terminal of the second electric switch, an input terminal connected to the first power input pin of the first connector, and an output terminal connected to the first power output pin of the second connector; and
      a fourth electric switch comprising a control terminal connected to the output terminal of the third electric switch via a fourth resistor, an input terminal connected to the second power input pin of the first connector, and an output terminal connected to the second power output pin of the second connector; and
   a second control circuit, comprising:
      a manual switch;
      a fifth electric switch comprising a control terminal connected to the second power input pin of the first connector via a fifth resistor and grounded via the manual switch, a power terminal connected to the second power input pin of the first connector via a sixth resistor, and a ground terminal;
      a sixth electric switch comprising a control terminal connected to the power terminal of the fifth electric switch, a power terminal connected to the second power input pin of the first connector via a seventh resistor, and a ground terminal;
      a seventh electric switch comprising a control terminal connected to the power terminal of the sixth electric switch, a power terminal connected to the control terminal of the second electric switch of the first control circuit, and a ground terminal; and
      an eighth electric switch comprising a control terminal connected to the output terminal of the fourth electric switch of the first control circuit via an eighth resistor, a power terminal connected to the power terminal of the sixth electric switch, and a ground terminal;
   wherein in response to the manual switch opening, the fifth electric switch is turned on, the sixth electric switch is turned off, and the seventh electric switch is turned on, such that the second, third, and fourth electric switches are turned off and the first control circuit cannot output the first and second voltage signals; and
   wherein in response to the HDD being effectively connected to the second connector, and the manual switch being closed, the detection pin outputs the detection signal at a low level to turn off the first electric switch, the fifth electric switch is turned off, the sixth electric switch is turned on, and the seventh electric switch is turned off, such that the second, third, and fourth electric switches are turned on, and the first and second voltage signals are transmitted to the HDD via the first control circuit and the second connector, and the second voltage signal is transmitted to the control terminal of the eighth electric switch via the eighth resistor to turn on the eighth electric switch, and the seventh electric switch remains turned off.

11. The circuit of claim 10, wherein the first, second, third, fourth, fifth, sixth, seventh, and eighth electric switches are metal-oxide-semiconductor field-effect transistors (MOSFETs).

12. The circuit of claim 11, wherein the first, second, fifth, sixth, seventh, and eighth electric switches are N-channel MOSFETs, and the control, power, and ground terminals of each of the first, second, fifth, sixth, seventh, and eighth electric switches are a gate, a drain, and a source, respectively.

13. The circuit of claim 11, wherein the fourth electric switch is an N-channel MOSFET, and the control, input, and output terminals of the fourth electric switch are a gate, a drain, and a source, respectively.

14. The circuit of claim 11, wherein the third electric switch is a P-channel MOSFET, and the control, input, and output terminals of the third electric switch are a gate, a source, and a drain, respectively.

15. The circuit of claim 10, wherein each of the first and second power input pins of the first connector, and the first and second power output pins of the second connector is grounded via a filtering circuit.

16. The circuit of claim 15, wherein each filtering circuit includes a first capacitor and a second capacitor connected in parallel.

17. The circuit of claim 16, wherein the first capacitor is an electrolytic capacitor to filter noise signals of low frequency.

18. The circuit of claim 16, wherein the second capacitor is a ceramic capacitor to filter noise signals of high frequency.

* * * * *